United States Patent
Kreuzer

(10) Patent No.: US 7,052,035 B2
(45) Date of Patent: May 30, 2006

(54) ASSEMBLY UNIT HAVING AN AIRBAG MODULE AND A VEHICLE STEERING WHEEL

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 482 days.

(21) Appl. No.: 10/117,913

(22) Filed: Apr. 8, 2002

(65) Prior Publication Data
US 2002/0153714 A1 Oct. 24, 2002

(30) Foreign Application Priority Data
Apr. 18, 2001 (DE) .................................... 201 06 694 U

(51) Int. Cl.
*B60R 21/20* (2006.01)

(52) U.S. Cl. .................. 280/728.2; 280/731; 200/61.55

(58) Field of Classification Search ................ 280/731, 280/728.2; 200/61.55, 61.54
See application file for complete search history.

(56) References Cited

U.S. PATENT DOCUMENTS 5,380,037 A * 1/1995 Worrell et al. .............. 280/731
5,620,201 A * 4/1997 Ricks ......................... 280/731
6,592,141 B1 7/2003 Dancasius et al.

FOREIGN PATENT DOCUMENTS

| DE | 19858691 | 6/2000 |
|----|----------|--------|
| JP | 10244946 | 9/1998 |
| JP | 11278194 | 10/1999 |

* cited by examiner

*Primary Examiner*—Peter C. English
(74) *Attorney, Agent, or Firm*—Tarolli, Sundheim, Covell & Tummino L.L.P.

(57) ABSTRACT

An assembly unit includes an airbag module, a vehicle steering wheel, horn contacts for a vehicle horn, and attachment devices by means of which the airbag module is attached to the steering wheel. A first detachable attachment device is provided which comprises a first holding part provided on the airbag module and a second holding part provided on the steering wheel. The holding parts engage with each other and allow pivoting of the module in a direction towards the steering wheel in order to close a second attachment device. The second attachment device is a detachable latching connection and the airbag module, in its attached state, is able to be moved axially in order to close the horn contacts.

15 Claims, 2 Drawing Sheets

ASSEMBLY UNIT HAVING AN AIRBAG MODULE AND A VEHICLE STEERING WHEEL

The invention relates to an assembly unit comprising an airbag module, a vehicle steering wheel and attachment means with which the airbag module is attached to the steering wheel.

More specifically, the invention relates to an airbag module in the form of a "floating" horn module. The airbag module is attached to the vehicle steering wheel in such a way that it can be moved axially in order to close two horn contacts by pressing on the airbag module.

BACKGROUND OF THE INVENTION

Usually, airbag modules are attached to a horn plate by means of at least two laterally arranged attachment screws. During the assembly process at the automobile manufacturer, in order to ensure that the module is centered on the steering wheel, a first screw has to be tightened slightly and, after the steering wheel has been turned, the second screw likewise has to be tightened. Finally, after the steering wheel has been turned once again, the first screw is tightened completely. This assembly method is time-consuming and expensive. For this reason, snap connections were developed in the form of several hooks provided on the rear of the module, the hooks extending into the horn plate or directly into the skeleton. This makes it possible to clip the module onto the horn plate or onto the steering wheel. Thus, the assembly is less time-consuming, although the disassembly, in which the hooks are grasped by a special tool and bent into a release position, is often difficult.

BRIEF SUMMARY OF INVENTION

Therefore, the object of the invention is to achieve a fast assembly as well as a fast disassembly of the assembly unit. This is achieved with an assembly unit comprising an airbag module, a vehicle steering wheel, horn contacts for actuating a horn, and attachment devices by means of which the airbag module is attached to the steering wheel. The attachment devices comprise at least one first and one second detachable attachment device. A first detachable attachment device has a first holding part provided on the airbag module and a second holding part provided on the steering wheel. The holding parts engage with each other and allow a pivoting of the module in a direction towards the steering wheel in order to close the second attachment device. The second attachment device is a detachable latching connection. The airbag module, in its attached state, is able to be moved axially in order to close the horn contacts.

With the assembly unit according to the invention, numerous snap connections are replaced by providing the first attachment means. Therefore, for the disassembly, far fewer tools have to be inserted laterally between the module and the steering wheel in order to bend the latching hooks into a release position that allows the module to be lifted off the steering wheel. The first attachment means is very simply designed, for it includes only the first and second holding parts, in other words, no screws or the like are provided to connect the first holding part and the second holding part to each other. The disassembly of the holding parts is also correspondingly simple. Preferably, the two holding parts are only connected to each other by being slid into each other, i.e. they are configured in such a way that the module is placed on the side of the first attachment means at a slight tilt toward the steering wheel and then, when the two holding parts are next to each other, the module has to be shifted until the two holding parts engage with each other. Subsequently, the upward tilted end of the module can be pivoted toward the steering wheel until the latching connection closes. The disassembly can simply be done in the reverse direction. The latching connection is detached, the module is tilted upward and shifted slightly laterally or radially until the holding parts are no longer engaged with each other.

In this manner, with the assembly unit according to the invention, only one latching connection is necessary to lock the airbag module in place. Preferably, in fact, just one attachment means can be provided.

Preferably, it is provided that the first and/or the second attachment means is/are configured in such a way that, when the module is in the arrested state, it/they permit/s the module to be moved axially in order to close the horn contacts. Concerning the first attachment means this means is a pivot bearing as well as an axial guide. According to this embodiment, the module is attached to the steering wheel itself or to a part that is affixed to the steering wheel. A return element stabilizes the position of the holding parts and simultaneously serves to force the module back into the initial position after the horn has been actuated.

A second embodiment makes provision that the airbag module is not attached directly to the steering wheel skeleton as in the first embodiment, but rather to a horn plate on which the module is locked via the attachment means. In order to actuate the horn, the horn plate can be moved axially relative to the steering wheel skeleton, so that the horn plate, together with the module, is pushed by the driver toward the skeleton. In this embodiment, the horn plate is associated with the vehicle steering wheel. However, the elastic return elements for forcing the module back into the initial position, on the one hand, and the elements for stabilizing the position of the holding parts in the locked position, on the other hand, are distinct elements.

Moreover, the second attachment means can also be associated with an elastic return element.

In the preferred embodiment, the first and the second attachment means are provided on opposite outer edges of the module in order to increase the stability of the module.

DETAILED DESCRIPTION OF THE PREFERRED EMBODIMENTS

Figure 1:
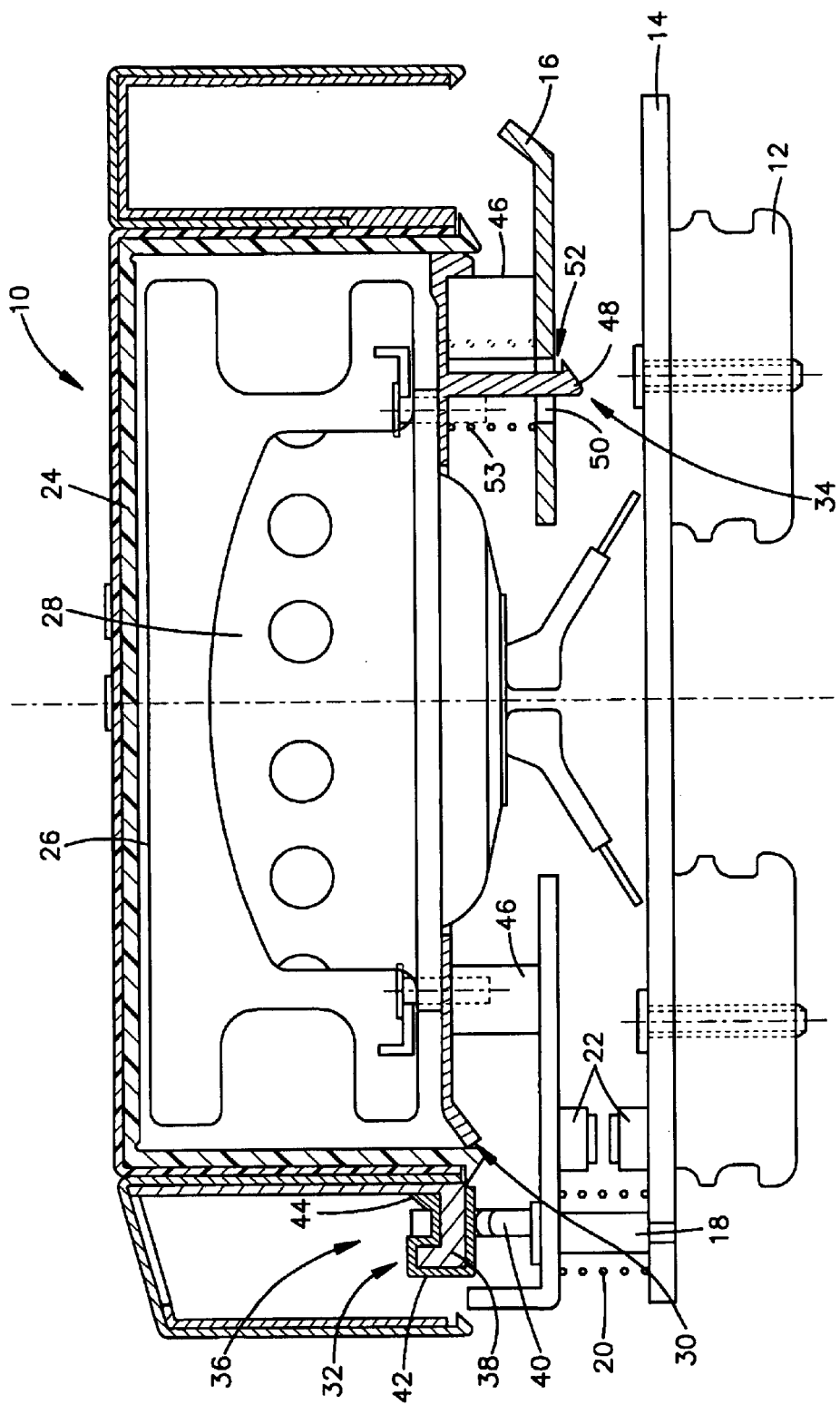
FIG. 1 is a cross-section through an assembly unit according to the invention of a first embodiment and, FIG. 2 is a cross-section through an assembly unit according to the invention of a second embodiment.

FIG. 1 shows a first embodiment of an assembly unit, consisting of an airbag module 10, a steering wheel and attachment means with which the airbag module 10 is attached to the steering wheel. The steering wheel itself is made up of a steering wheel skeleton 12, a metal plate 14 screwed onto it and a horn plate 16 that is movably mounted axially to the metal plate 14 by means of several pins 18, only one of which is shown here. There is an elastic return element 20 around each pin 18. The horn plate 16 and the metal plate 14 have horn contacts 22 that are at a distance from each other when the horn is not in the actuated position. When the horn plate 16 is pressed downwards, the elastic return elements 20 yield until the horn contacts 22 are closed, that is to say, until they touch each other. After the horn has been actuated, the elastic return elements 20 force the horn plate back up into the initial position shown.

The airbag module 10 comprises a pot-shaped receptacle 24 in which an airbag 26 and a gas generator 28 are accommodated and also comprises a baseplate 30 that serves to close the receptacle 24. The airbag module is attached merely via two attachment means 32, 34 to the horn plate 16. The first attachment means has a first holding part 36 that is affixed to the edge of the baseplate 30 and that is in the form of a hook-shaped end facing radially outwards, namely, in the form of an L shaped end 38. On the steering wheel, namely, on the horn plate, there is a second holding part 40 in the form of a stirrup with a rectangular receiving opening. The free end 38 of the first holding part 36 has is slid through the receiving opening of the stirrup 40 in such a way that the holding parts 36, 40 engage each other in the position shown. In order to prevent lateral shifting of the holding parts 36, 40 that form the first attachment means 32, the free end 38 is covered with a covering 42 made of an elastomer. Furthermore, the covering 42 prevents rattling noises. One or more ribs 44 on the holding part 36 form a lateral stop so that the second holding part 40 is clamped laterally between the elastic covering 42 and the rib or ribs 44.

So that the module 10 does not slip downwards in the area of the first attachment means 32, so that the module 10 is pre-stressed in an axial, upward direction and so that the holding parts 36, 40 do not become disengaged, there is an elastic return element 46 situated between the baseplate 30 and the horn plate 16, near the first attachment means 32. The elastic return element 46 maintains the holding parts 36, 40 in the position shown and biases the module 10 upwards.

On the edge of the airbag module opposite from the first attachment means 32, there is arranged a second attachment means 34 that consists only of one latching connection. A latching hook 48 projects from the back of the baseplate 30 and, in the locked position, the latching hook 48 extends through an opening 50 in the horn plate 16 and grasps behind the horn plate 16. An elastic stirrup spring 52, preferably in the form of a leg spring, secures the latching connection. In addition or as an alternative, an element corresponding to the return element 46 can be provided in the area of the second attachment means 34. The latching hook 48 is surrounded by a helical spring 53 that serves to return the module and to stabilize the position of the latching connection.

The airbag module 10 is attached to the horn plate 16 in that the edge of the module 10 is moved near the second holding part 40 in a more or less tilted position downward to the horn plate 16 and is then shifted laterally until the first holding part 36 engages with the second holding part 40. In this state, the two holding parts 36, 40 allow a downward pivoting of the edge of the module close to the latching hook 48. The latching hook 48 finally latches with the stirrup spring 52. During the assembly, the return elements 46 and the stirrup spring 52 have to be slightly pressed together. After the module 10 is released, however, they push the module back upwards again so that the module 10 is locked firmly to the horn plate 16 by means of just two attachment means 32, 24. The elastic return elements 46 are preferably elastomers that also prevent a lateral shifting of the module 10 towards the horn plate 16, while also preventing rattling noises.

Theoretically, the assembly could also be carried out without a pivoting of the module 10. For this purpose, the module 10 could be placed from the top on the horn plate 16, with reference to FIG. 1 offset to the right, and subsequently moved downwards under axial pressure so far to the left until the latching connection is engaged. After the module is released, the return elements 46 would bring the module into the position shown.

However, if the holding parts 36, 40 first engage with each other in order to form a pivot bearing, then the latching hook 48 is reliably guided into the opening 50 so that this opening, unlike in the second assembly version, does not first have to be sought. In order to form a non-tilting pivot bearing, it can be necessary for the first attachment means 32 to be made up of two consecutively arranged holding parts 36, 38 or else of additional such pairs, in order to diminish the risk of tilting for the module 10.

Since the two attachment means 32, 24 can be non-destructively detached and since only one latching connection is provided, the module 10 can be disassembled very quickly in that, from below the horn plate 16, a tool is inserted radially inwards in order to press the stirrup spring 52 to the right into a release position. The module 10 is detached from the horn plate 16 upwards and with a pivoting motion.

Figure 2:
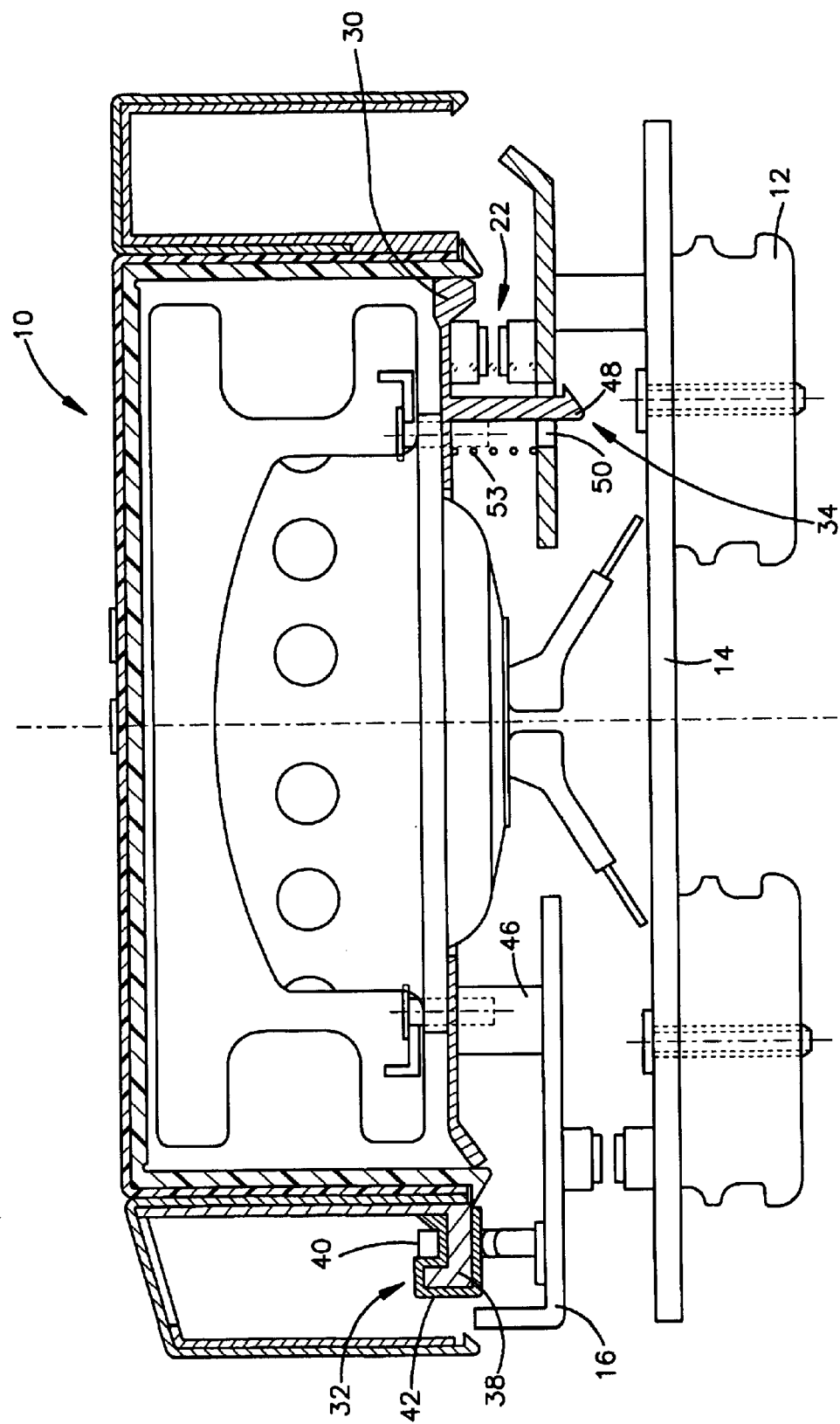

The embodiment according to FIG. 2 is very similar to that of FIG. 1, so that only the differences need to be elaborated upon. In this embodiment, the horn plate 16 is rigidly attached to the skeleton 12 or to the metal plate 14. Therefore, the horn plate 16 is not moved along when the horn is actuated, that is to say, when the module 10 is pressed downwards. Consequently, an axial movement is only possible between the module 10 and the horn plate 16. Since the first attachment means 32 is configured here as a pure pivot bearing, the module 10 can only be pressed downwards in the area of the second attachment means 34 in order to close the horn contacts 22. This is why, in the area of the second attachment means 34, the horn contacts 22 are provided on the top of the horn plate 16, on the one hand, and on the rear of the baseplate 30, on the other hand.

The two attachment means 32, 34 not only allow the easy assembly and disassembly already described in conjunction with FIG. 1, but they also allow a movement (pivoting) of the airbag module 10 towards the horn plate 16 until the horn contacts 22 are closed. The return element 20 of FIG. 1 can be dispensed with. Its function is performed by the elastic return elements 46 and optionally additionally by the spring element 53.

As an alternative to the embodiment shown in FIG. 2, the metal plate 14 and the horn plate 16 can be left out so that the module is attached directly to the skeleton 12. For this purpose, the skeleton 12 has the second holding part 40 as well as the opening 50.

From the above description of the invention, those skilled in the art will perceive improvements, changes and modifications. Such improvements, changes and modifications within the skill of the art are intended to be covered by the appended claims.

What is claimed is:

1. An assembly unit comprising:
   an airbag module;
   a vehicle steering wheel;
   horn contacts for actuating a vehicle horn; and
   attachment means for attaching said airbag module to said vehicle steering wheel, said attachment means including at least one first detachable attachment means and at least one second detachable attachment means,
   said first attachment means having a first holding part provided on said airbag module and a second holding part provided on said vehicle steering wheel, said first and second holding parts engaging each other and allowing pivoting of said airbag module in a direction towards said vehicle steering wheel in order to close said second attachment means, one of said first or second holding parts having an elastic covering and clamping the other of said first or second holding parts laterally by said elastic covering contacting the other of said first of second holding parts, said second attachment means being a detachable latching connection, said airbag module, in an assembled state, being able to move axially relative to said vehicle steering wheel in order to close said horn contacts.

2. The assembly unit according to claim 1 wherein at least one of said first and second attachment means permits movement of said airbag module, in the assembled state, in an axial direction relative to said vehicle steering wheel in order to close said horn contacts.

3. The assembly unit according to claim 1 wherein at least one elastic return element forces said airbag module into an initial position after said horn contacts have been closed.

4. The assembly unit according to claim 3 wherein said airbag module is attached to a horn plate such that said horn plate can move axially with respect to said vehicle steering wheel to close said horn contacts.

5. The assembly unit according to claim 3 wherein a return element is arranged near said first attachment means, said return element urging said first and second holding parts into contact with each other in order to stabilize the relative position of said first and second holding parts.

6. The assembly unit according to claim 5 wherein one common element defines said return elements for forcing back said airbag module and for stabilizing said first and second holding parts.

7. The assembly unit according to claim 1 wherein an elastic spring element is provided near said second attachment means and is associated with said second attachment means, said elastic spring element urging said second attachment means into a latched position.

8. The assembly unit according to claim 1 wherein an elastic spring element is provided near said second attachment means and is associated with said second attachment means, said elastic spring element urging said airbag module into an initial position after the horn has been actuated.

9. The assembly unit according to claim 1 wherein said first and second attachment means are provided on opposite outer edges of said airbag module.

10. The assembly unit according to claim 1 wherein one of said first or second holding parts has a hook-shaped end and the other of said first or second holding parts is configured as a receptacle for said hook-shaped end.

11. The assembly unit according to claim 10 wherein one of said first or second holding parts has at least one rib at said hook shaped end forming a lateral stop for the other of said first or second holding parts.

12. An assembly unit comprising:

an airbag module;

a vehicle steering wheel with a central axis defining an axial direction;

horn contacts for actuating a vehicle horn; and attachment means for attaching said airbag module to said vehicle steering wheel, said attachment means including at least one first detachable attachment means and at least one second detachable attachment means, said first attachment means having a first holding part provided on said airbag module and a second holding part provided on said vehicle steering wheel, said first and second holding parts engaging each other and allowing pivoting of said airbag module in a direction towards said vehicle steering wheel in order to close said second attachment means, said first and second holding parts engaging each other in a direction perpendicular to said axial direction such that lateral shifting between said first and second holding parts is restricted, said second attachment means being a detachable latching connection, said airbag module, in an assembled state, being able to move axially relative to said vehicle steering wheel in order to close said horn contacts.

13. The assembly unit according to claim 12 wherein at least one of said holding parts has an elastic covering for ensuring a firm fit between said first and second holding parts.

14. The assembly unit according to claim 12 wherein said second attachment means has only one latching connection.

15. The assembly unit according to claim 12 wherein only one first attachment means is provided.

* * * * *